No. 759,426. PATENTED MAY 10, 1904.
S. EVERSHED.
ELECTRIC SOLDERING IRON.
APPLICATION FILED DEC. 8, 1903.
NO MODEL. 2 SHEETS—SHEET 1.
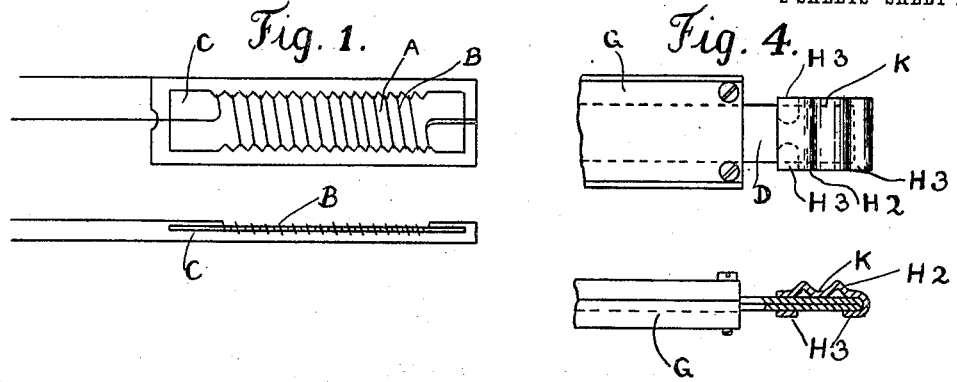
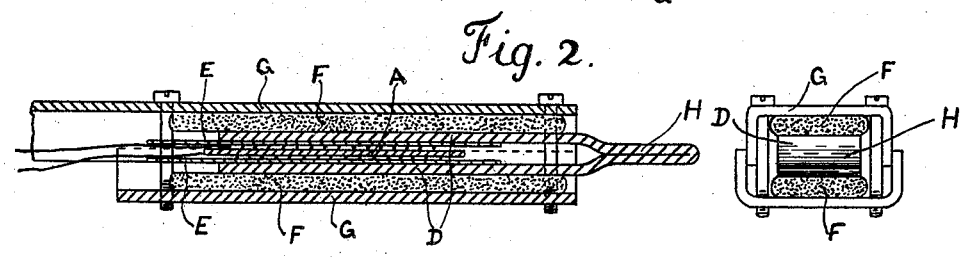
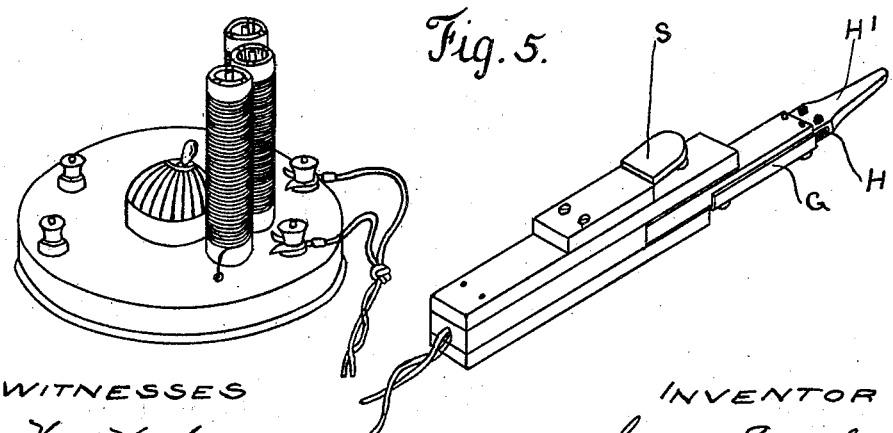
WITNESSES
Wm. Kuehne
John A. Percival
INVENTOR
Sydney Evershed
By Richardson
ATTORNEYS No. 759,426. PATENTED MAY 10, 1904.
S. EVERSHED.
ELECTRIC SOLDERING IRON.
APPLICATION FILED DEC. 8, 1903.
NO MODEL. 2 SHEETS—SHEET 2.
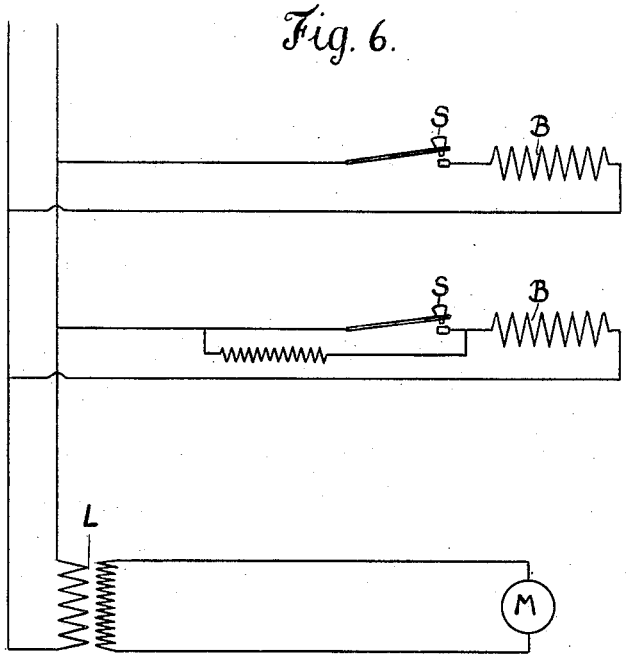
Fig. 6.
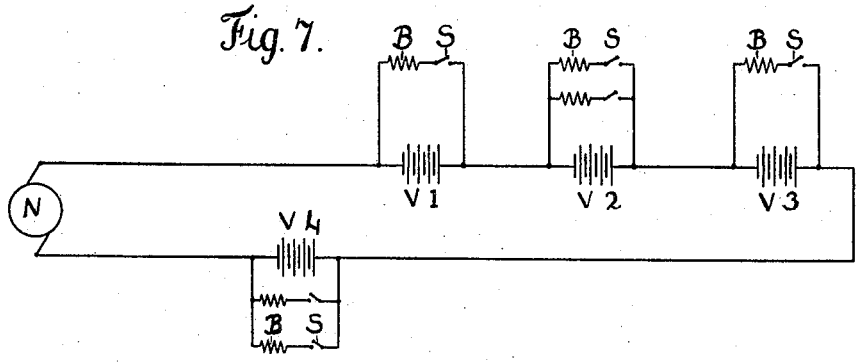
Fig. 7.
WITNESSES
W. M. Kuehne
John A. Percival
INVENTOR
Sydney Evershed
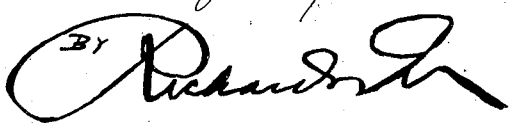
ATTORNEYS No. 759,426. Patented May 10, 1904.

UNITED STATES PATENT OFFICE.

SYDNEY EVERSHED, OF LONDON, ENGLAND, ASSIGNOR TO HIMSELF AND EVERSHED AND VIGNOLES, LIMITED, OF LONDON, ENGLAND, A CORPORATION OF GREAT BRITAIN AND IRELAND.

ELECTRIC SOLDERING-IRON.

SPECIFICATION forming part of Letters Patent No. 759,426, dated May 10, 1904.

Application filed December 8, 1903. Serial No. 184,339. (No model.)

*To all whom it may concern:*

Be it known that I, SYDNEY EVERSHED, a subject of the King of Great Britain and Ireland, residing at London, England, have invented a certain new and useful Improvement in Electric Soldering-Irons, of which the following is a specification.

This invention relates to electric soldering-irons, and has for its object the construction of an electric soldering-iron which shall enable soldering to be rapidly and easily effected with a minimum expenditure of electric energy, and thus with economy in the production of the necessary heat and in wear and tear comparing favorably with externally-heated soldering-irons and with other known appliances.

The improvements consist in the limitation of the necessary electric heating resistance to the form and dimensions of a wire, in the disposal of such wire, so that it is in close thermal contact (insured by pressure) through a slight but sufficient insulator with a piece of copper or other good conductor of heat protected from external radiation and itself forming the bit and of a minimum mass with large surface for the reception of the heat, and, further, in means for controlling and regulating the electric current for heating the tool and in the construction and arrangement of the tool as a whole.

In this specification my soldering-iron is hereinafter referred to as a "tool." The resistance is called the "heater," the piece of copper is called the "carrier," and that part of the carrier which serves to hold the solder is called the "bit."

To enable the tool to be brought to a soldering temperature in the least possible time, I make the carrier of a very small total mass. To reduce the consumption of energy as much as possible, I inclose the whole of the tool with the exception of the bit in asbestos or other suitable non-conductor of heat. To enable a sufficient amount of energy to be consumed in a small space without the risk of melting the heater, I establish good thermal contact between the resistance-wire and the carrier through a slight but sufficient insulator, so that the temperature of the wire does not greatly exceed that of the carrier.

One form of my soldering-tool well adapted for soldering joints in small wires is made as follows: The heater may be conveniently made of wire wound upon a thin and narrow strip of mica, which has serrated edges to keep the turns of wire in place. The heater is covered on each side by thin sheet-mica, as an insulator, but which is at the same time a fair conductor of heat. The carrier is formed from a narrow strip of sheet-copper about one inch longer than the length of the heater. The copper strip is folded upon itself, forming a double thickness of half the original length. The heater covered by thin mica sheets is inserted between the two thicknesses of the copper strip and so arranged that the folded end of the carrier projects about half an inch beyond the heater, so as to form the bit. Two pieces of asbestos sheet are fixed one on either side of the carrier and clamped firmly in place by means of an iron or steel clamp, which serves to press the carrier and heater into close thermal contact and is itself fixed to a suitable handle. The heater is connected to suitable terminals fixed on or within the handle, to which a flexible conductor connected with a source of electric energy may be coupled.

I provide a key-switch upon the handle, by means of which the operator may switch the current on or off at will, or the opening of the switch may be made to introduce additional resistance into the circuit of the heater, so that the tool is thus only supplied with just sufficient energy to keep it at about or just below the melting-point of solder. Closing the switch then raises the temperature almost instantaneously to that required for soldering. To avoid the necessity for expensive heaters of sufficiently high resistance to enable them to be supplied at one hundred or two hundred volts, I prefer to adapt my tools for a comparatively low voltage, so that the heater can be made of a short piece of comparatively thick and strong wire, which is not liable to be broken and can be easily and cheaply renewed when required.

For supplying a number of my soldering-tools which may be required in a workshop or factory I may use a separate system of distribution deriving its energy at any voltage from a lighting or power circuit and by means of any known method of transformation feeding the soldering-tools at the voltage for which they are adjusted. For supplying a soldering-tool in a place where no low-tension supply is available I may connect the tool direct onto a power or lighting circuit with a sufficient resistance in series to reduce the current in the tool to the required value.

For supplying a soldering-tool in a place where no electric supply of any kind is available I may provide the required energy by means of a portable battery or preferably by means of a portable hand-dynamo.

My soldering-tool may be modified in many ways, both as regards the size and power of heater and as regards the size and shape of the bit, so as to adapt the tool for the particular kind of work it is intended to solder. For some purposes it may be convenient to make the bit separate from the carrier and attached thereto by means which provide good thermal contact between the two. Detachable or alternative bits of several shapes adapted to different kinds of work may then be used with one soldering-tool. One of these may have a shallow trough depression tinned only on the inner face, which I have found very suitable for soldering wires.

I may use any resistance-wire for the heater; but I prefer to use either platinum or other kindred metal or one of the high resistance alloys of iron. The latter have the advantage of not being attacked by the lead in the solder; but the platinum has the advantage of a higher melting-point and freedom from oxidation.

In order that my invention may be the better understood, I will now proceed to describe the same with reference to the drawings annexed hereto and to the letters marked thereon.

In the drawings like letters refer to like parts.

Figure 1 is a detached view as a detail in plan and elevation of the heater. Fig. 2 is a longitudinal section and end view of the heater, the carrier, and the clamp assembled as a tool. Fig. 3 is a longitudinal section of a modified form of tool. Fig. 4 is a plan and side elevation of a special form of bit. Fig. 5 is a perspective view of the switchboard and soldering-tool as a connected tool ready for work. Figs. 6 and 7 are diagrammatic views of circuits adapted to serve any number of soldering-tools under different circumstances of supply-current.

In Fig. 1, A shows a simple and preferable form of heater, comprising a resistance-wire B, wound round a flat strip of mica C, which has serrated edges adapted to receive the convolutions of wire.

Fig. 2 shows the heater A and carrier D, clamped up by clamps G, ready to be inserted into a handle or holder. The carrier D is preferably a flat strip of copper doubled on itself and firmly pressed into thermal contact with the heater A, two strips of very thin mica E E being inserted between the heater A and the carrier D to insulate the two electrically. Wasteful radiation of heat is prevented so far as possible by inserting sheets of asbestos F F or other like material between the carrier D and the clamps G. The folded nose H of the carrier D in this case forms the bit of the tool.

Fig. 3 shows a modification in which there are two heaters A' and A² and two carriers D' and D². The ends of the carriers are inserted in a detachable bit H'. This modification may be usefully employed when a large supply of heat is required for heavy soldering. Any number of heaters may be put together to form one soldering-tool, provided each heater has its own independent carrier to absorb the heat and convey it to the bit.

Fig. 4 shows a modified form of detachable bit particularly adapted for soldering joints in wires. The bit is made from sheet-copper and has a tinned groove K formed in it, adapted to carry a pool of melted solder, in which the joint between two pieces of wire may readily be immersed. The bit is firmly attached to the end of the carrier by means of projections or ears H³, which are folded tightly underneath the carrier. A bit of this type is readily removed when worn out, and a new one can as easily be fixed to the carrier. I do not confine myself to the use of bits similar to those shown in Figs. 3 and 4, but may provide my soldering-tool with any number of detachable bits adapted for different kinds of work.

Fig. 5 shows a suitable switchboard with resistances in series for attachment to a lighting or power circuit and the soldering-tool connected to the terminals of the said switchboard.

Fig. 6 shows the electric connections for supplying energy to the soldering-tools. As a typical example, an alternate-current supply from an alternator M is shown, which feeds a low-tension circuit through a step-down transformer L. I show the heating-coil B of one tool adapted to have its circuit opened and closed by means of a thumb-key switch S, fitted in the handle of the tool, as shown in Fig. 5. In this case the tool is heated up whenever required by closing the key. I show also an alternative arrangement in which a heater-coil B is connected permanently in circuit through a resistance R. This additional resistance is so prepared as to pass a current which will just maintain the temperature of the soldering-iron below that required to melt the solder. Closing the key-switch S then rapidly raises the temperature to the soldering-point.

In Fig. 7 is shown a convenient arrangement for supplying a number of soldering-tools throughout a factory where an energy from a continuous-current dynamo is available, but is supplied at too high a voltage for the soldering-tools. A circuit is run from the dynamo N, and at places where soldering-irons are required a small secondary battery $V'$ $V^2$, &c., is inserted in the circuit, so as to be continuously charged. Each of these batteries supplies a low-tension circuit, to which one or more soldering-tools may be connected.

Having now described my invention, what I claim, and desire to secure by Letters Patent, is—

1. In combination, in an electrically-heated soldering-tool, an electric resistance adapted as a heater; a metallic conductor of heat, of small mass, in close thermal contact with the heater, adapted as a carrier of heat to a bit; and a tinned piece of metal connected with the carrier, adapted to melt and apply the solder.

2. In combination, in an electrically-heated soldering-tool, a flat core of mica; a naked resistance-wire wound thereon; thin sheets of mica on either face of the flat coil; thin copper heat-carrying strips in thermal contact with the said mica sheets and coil; and an external clamp pressing the said parts into intimate contact with one another.

3. In combination, in an electrically-heated soldering-tool, a central electric resistance adapted as a heater; insulating sheets of mica on either side of the resistance; a metallic conductor of heat, of small mass in close thermal contact with the said heater, adapted as a carrier of heat to a bit; a sheathing of non-heat-conducting material such as asbestos; a metallic clamp, clamping the said parts together; and an external handle of wood or vulcanite.

4. The combination with an electric soldering-tool of a detachably attached bit provided with a transverse depressed trough or groove, for facilitating the soldering of wires.

5. In combination, in an electric soldering-tool, an electric heater in the body of the tool; a circuit to the heater in the handle of the tool; a break in such circuit closed by a shunt-circuit with a resistance therein; and a spring recoil-switch and contact, adapted to bridge the break in the said circuit, on closure of the spring-switch, to short-circuit the said shunt-circuit and resistance.

In witness whereof I have hereunto set my hand in presence of two witnesses.

SYDNEY EVERSHED.

Witnesses:
REGINALD WILLIAM JAMES,
RICHARD A. HOFFMANN.